April 7, 1959 H. D. KUESTER 2,880,811
AGRICULTURAL VEHICLE

Filed June 20, 1956 4 Sheets-Sheet 1

Inventor
Harlan D. Kuester
By
Stevens, Davis, Miller, Mosher
His Attorneys

April 7, 1959     H. D. KUESTER     2,880,811
AGRICULTURAL VEHICLE
Filed June 20, 1956     4 Sheets-Sheet 2
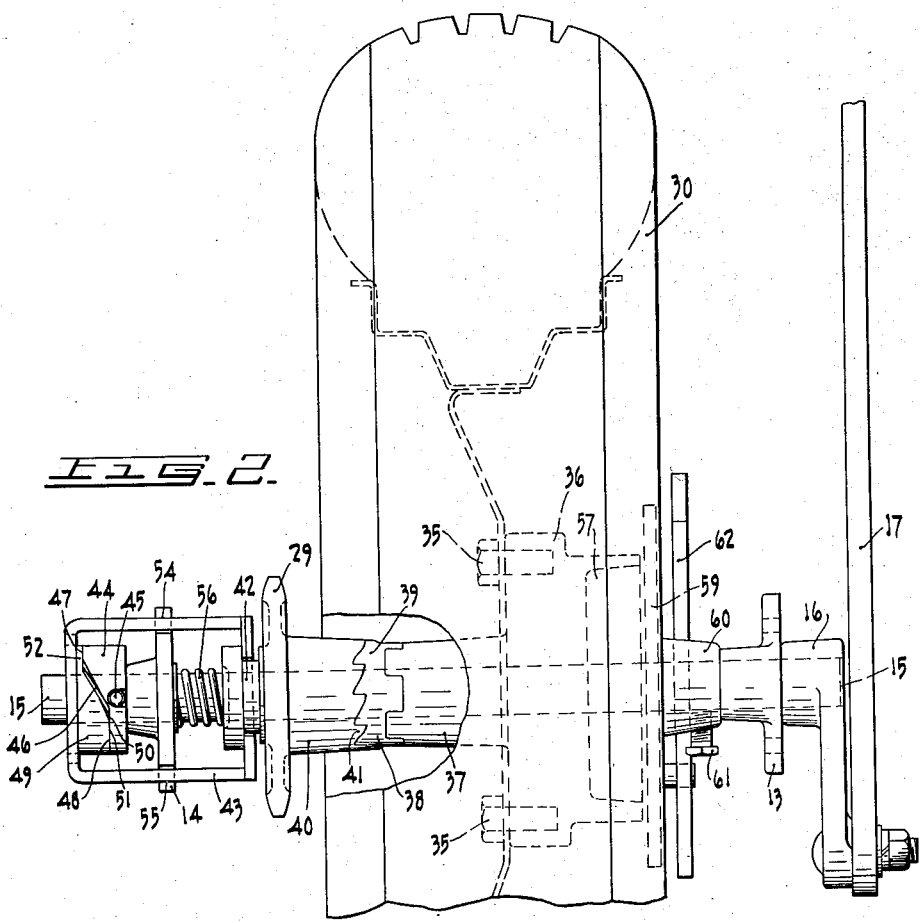
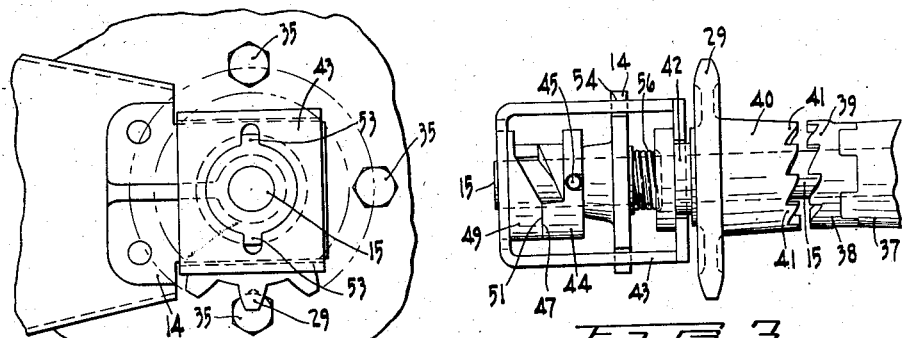
Inventor
Harlan D. Kuester
By
Stevens, Davis, Miller + Mosher
Attorneys April 7, 1959
H. D. KUESTER
2,880,811
AGRICULTURAL VEHICLE
Filed June 20, 1956
4 Sheets-Sheet 3
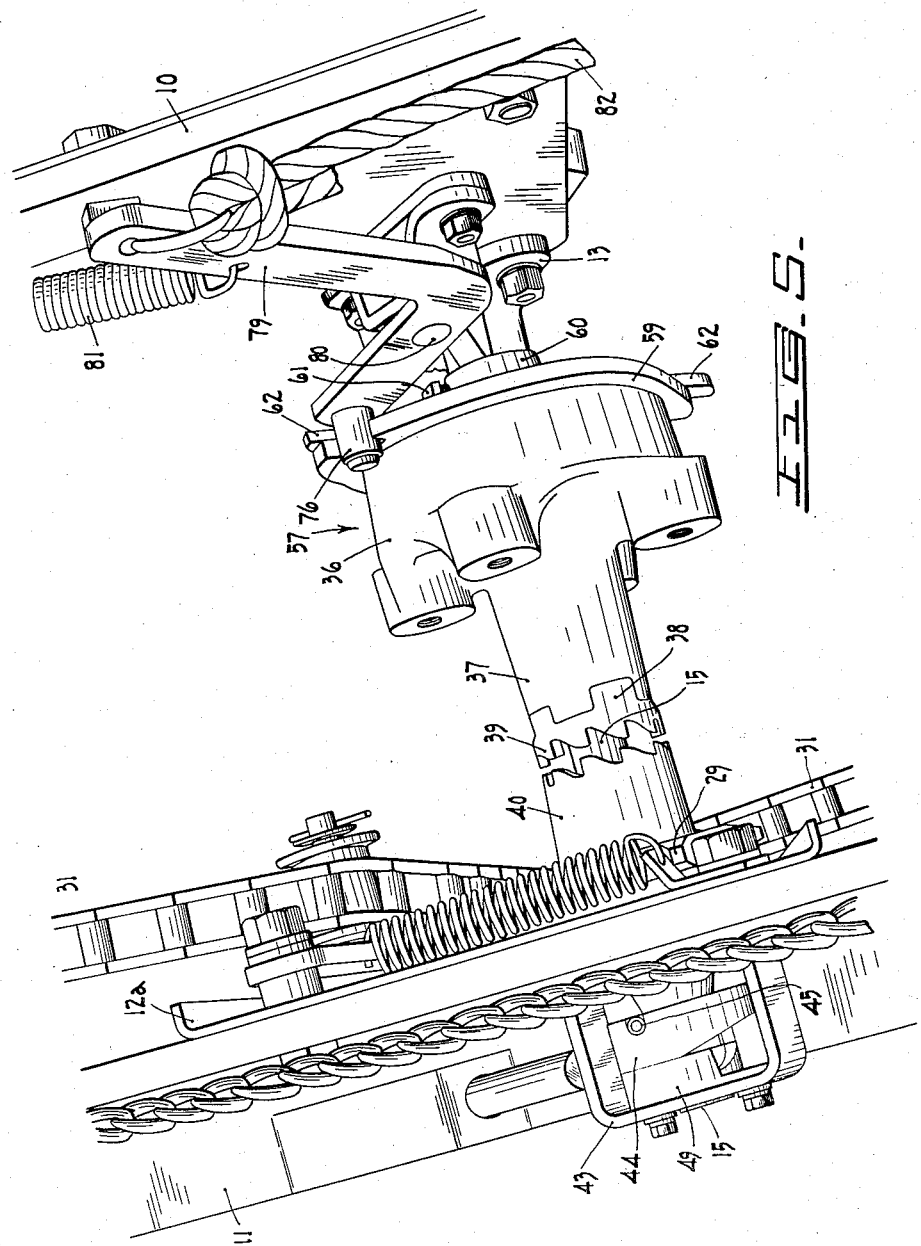
Inventor
Harlan D. Kuester
By
Stevens, Davis, Miller Mosher
his Attorneys April 7, 1959  H. D. KUESTER  2,880,811
AGRICULTURAL VEHICLE
Filed June 20, 1956  4 Sheets-Sheet 4
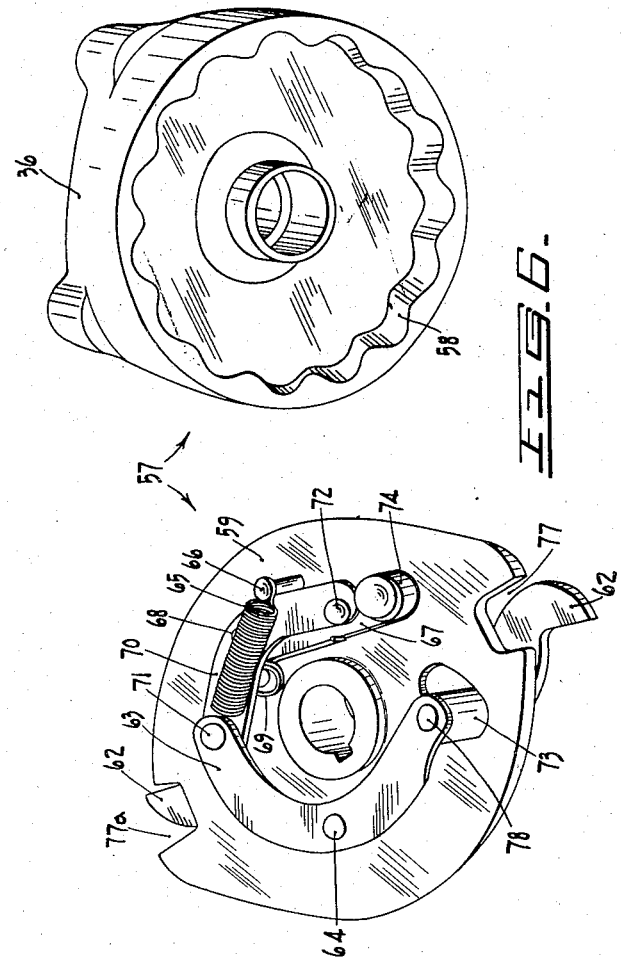
Inventor
Harlan D. Kuester
By
his Attorneys

United States Patent Office 2,880,811
Patented Apr. 7, 1959

2,880,811

AGRICULTURAL VEHICLE

Harlan D. Kuester, Brantford, Ontario, Canada, assignor to Cockshutt Farm Equipment, Limited, Brantford, Ontario, a company of Canada Application June 20, 1956, Serial No. 592,687

4 Claims. (Cl. 172—75)

This invention relates to an agricultural vehicle and more particularly to a clutch construction for use in agricultural vehicles.

Agricultural vehicles such as ground powered planters have previously been provided in which an operating mechanism such as a seed or fertilizer release mechanism is driven by a driving sprocket from the wheels of the vehicle. The ground engaging implements such as a furrowing member are raised and lowered under power transmitted from the wheels by using a control shaft connected to actuate a linkage for successively raising and lowering the ground engaging implements. A clutch is provided to drive the control shaft from the wheels of the vehicle. This clutch is of the type which disengages automatically after a partial revolution of the control shaft. Engagement of the clutch partially rotates the control shaft to raise the ground engaging implements, the next engagement of the clutch acting additionally to partially rotate the control shaft to lower the ground engaging implements. Although the foregoing principles are usually applied to ground powered vehicles, similar principles can also be applied to self-propelled vehicles.

Agricultural vehicles of the type described above suffer from the disadvantage that the operating mechanism has to be separately disconnected for transporting the vehicle. A sprocket chain and other moving parts continue to be driven by the sprocket wheel referred to above with consequent wear, necessity of maintenance and noise. Also the live sprocket chain and other moving parts create a hazard during transportation.

The object of this invention is to provide a convenient and effective clutch construction for automatically disengaging a driven member such as said sprocket wheel from its driving member while the ground engaging implements are in transport position and for automatically re-engaging the driving and driven members when the ground engaging implements are in working position.

The manner in which the foregoing is accomplished will be apparent from the detailed description which follows of the preferred embodiment of this invention. The scope of this invention will be apparent from the appended claims.

In the drawings which illustrate the preferred embodiment of this invention:

Figure 2 is an oblique bottom plan view of part of the structure shown in Figure 1 but illustrating the driving wheel in position and showing an engaged position of the clutch construction.

Figure 3 is a view corresponding with part of Figure 2 but showing a disengaged position of the clutch construction.

Figure 4 is an end elevation view of Figure 2.

Figure 5 is a perspective view showing part of the vehicle but regarded from a different aspect from Figure 1.

Figure 6 is a detailed view showing the disassembled components of a clutch which can be used in the vehicle.

Figure 1:
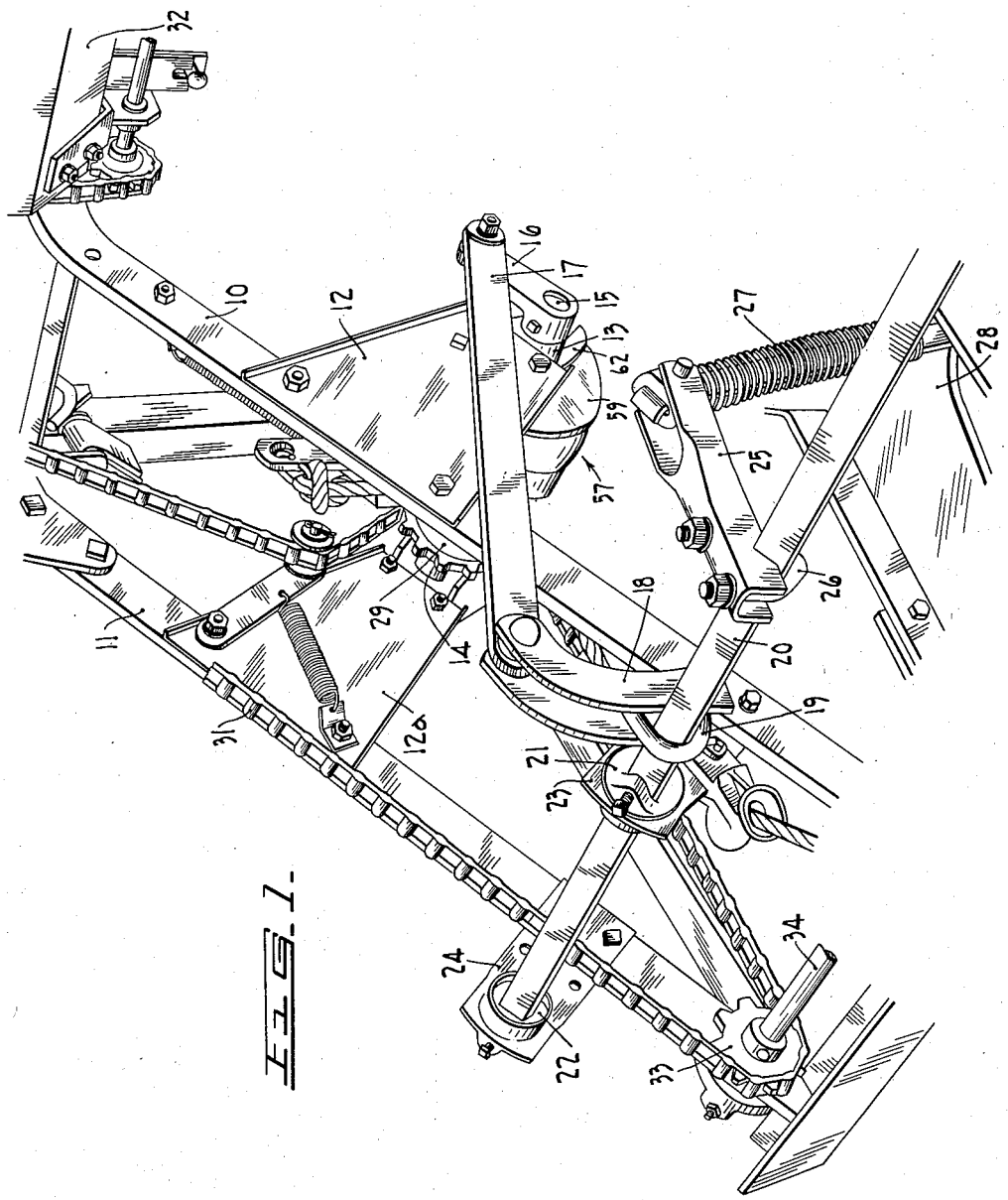
Figure 1 is a perspective view of part of a vhicle embodying this invention but with the driving wheel removed for clarity of illustration.

Referring now to the drawings, the vehicle illustrated in Figure 1 comprises frame members 10 and 11 to which are secured bearing mounting brackets 12 and 12a which carry the bearings 13 and 14 for a wheel axle shaft 15 which, as will be apparent below, also acts as a control shaft. A crank 16 is mounted on shaft 15 and is connected by a link 17 to a lever 18. Lever 18 is secured by U bolt 19 to a beam 20 which is journalled by bearings 21 and 22 in brackets 23 and 24. Brackets 23 and 24 are mounted on frame members 10 and 11 respectively. An arm 25 is secured to beam 20 by U bolt 26 and is linked by a resilient connecting member 27 to the shank portion 28 of a ground engaging implement, in this instance a furrowing device. The ground engaging implement is not shown in detail as it may be of conventional design. Rotation of crank 16 by axle shaft 15 reciprocates link 17 causing lever 18 to rock beam 20 and acting through lever 25 and connecting member 27 successively to raise and lower the ground engaging implement 28. When implement 28 is raised it is in transport position and when it is lowered it is in working position.

A sprocket wheel 29 is driven from wheel 30 (shown in Figures 2 and 3) and drives a sprocket chain 31 to operate the metering and discharge mechanism of a fertilizer hopper shown in part at 32 in Figure 1. The detailed operating mechanism of the fertilizer hopper is not shown in detail as it may be of conventional design. Sprocket chain 31 also drives a sprocket wheel 33 which in turn drives a shaft 34 to actuate other operating mechanism (not shown) of the vehicle such as a seed dispensing device.

Referring now particularly to Figures 2, 3 and 4 of the drawings, wheel 30 is connected by bolts 35 to a clutch housing 36 which provides a wheel hub. Clutch housing 36 is freely mounted on control shaft 15 and includes a boss 37 to which is secured a clutch element 38 having axially directed dogs 39. Sprocket wheel 29 has a boss portion 40 providing a clutch element with dogs 41, shown in Figure 2 in engagement with dogs 39. Sprocket wheel 29 also has a collar 42 which is engaged by a yoke 43. A compression spring 56 acts between bearing 14 and collar 42 normally to urge clutch elements 38 and 40 together and to urge yoke 43 in the direction of these clutch elements. A cam member 44 is mounted by pin 45 on shaft 15 and has an axially directed surface 46 comprising a raised portion 47 and a low portion 48. A second cam member 49 is connected to yoke 43 at 53 and has an axially directed surface 50 having a raised portion 51 and a low portion 52. Yoke 43 is restrained from rotation by sliding connections at 54 and 55 with bearing 14. If shaft 15 is rotated in a clockwise direction with respect to Figure 4, the raised portion 47 of cam member 44 will come into registration with the raised portion 51 of cam member 49, causing yoke 43 to move outwardly to a retracted position against the influence of spring 56. This retracted position in which clutch elements 38 and 40 are disengaged from each other is shown in Figure 3. When the yoke and, consequently, the clutch elements are retracted, drive will no longer be transmitted from wheel 30 to sprocket 29. Continued partial rotation of shaft 15 to complete a revolution of the shaft will result in cam members 44 and 49 returning to the position shown in Figure 2.

The successive partial rotations of shaft 15 necessary successively to disengage and engage clutch elements 38 and 40 is achieved by clutch 57 which may be of conventional design and one form of which is illustrated in Figure 6. Clutch 57 comprises clutch housing 36, the inner surface of the side wall of which has a series of keyways 58. A clutch plate 59 having a hub 60 is secured by bolt 61 to shaft 15. A control latch member 62 is rotatably mounted on hub 60. Within clutch 57 there is an arm 63 pivotally mounted by pin 64 on plate 59 and urged in a clockwise direction with respect to Figure 6 by spring 65 which is connected to pin 66. A second arm 67 is pivoted at 68 and urged outwardly by spring 69. Curved link 70 connects at 71 to one end of arm 63 and at 72 to an intermediate portion of arm 67. Arm 63 bears a roller 73 and arm 67 has a roller 74. When roller 73 is biased inwardly clutch 57 is released. When roller 73 is allowed to bias outwardly under the influence of spring 65, roller 74 is also biased outwardly and rollers 73 and 74 both engage keyways 58 to lock the clutch. Clutch 36 is normally held in disengaged position by a pin 76 (shown in Figure 5) which engages a slot 77 in clutch plate 59 and presses against latch members 62. The pin 78 upon which roller 73 is mounted connects arm 63 to latch member 62. Upon disengagement of pin 76, clutch 57 rotates shaft 15 for 180 degrees following which pin 76 engages a second slot 77a and at the same time forces latch 62 to a disengaged position. A further release of pin 76 similarly causes another 180° partial revolution of shaft 15. Pin 76 is mounted on a crank arm 79 which is pivotally mounted on bracket 12 at 80 and which is biased towards slot engaging position of pin 76 by spring 81. Pin 76 is manually released by a pull on cord 82.

It will be appreciated from the foregoing that the engagement of clutch 57 acts both to raise the ground engaging implements and at the same time to release sprocket 29. The subsequent engagement of clutch 57 lowers the ground engaging implements and engages clutch elements 38 and 40 so that sprocket 29 will be driven by wheel 30. Cams 44 and 49 are shaped as illustrated to operate to change between advanced and retracted positions during about 30° of travel of shaft 15, this 30° of travel is arranged to occur at the initiation of the raising of the ground engaging implements and near the completion of their lowering so that fertilizer or seed will not be scattered on the surface and wasted.

I claim:

1. In an agricultural vehicle of the type described, a clutch construction comprising a driving member, means for driving said driving member, a first clutch element connected to said driving member, a driven member, a second clutch element connected to said driven member and engaging said first clutch element, a normally stationary control shaft co-axial with said driving and driven members and with said clutch elements, means actuated by said control shaft to disengage said first and second clutch elements upon a predetermined partial rotation of said control shaft and to re-engage said first and second clutch elements upon an additional predetermined partial rotation of said control shaft, and additional clutch means mounted on said driving member and said control shaft and engageable drivably to couple said driving member to said control shaft for a predetermined partial rotation of said control shaft and to uncouple said driving member and control shaft after the last mentioned predetermined partial rotation of said control shaft, successive engagements of said additional clutch means acting alternately to engage and disengage said first and second clutch elements.

2. In an agricultural vehicle of the type described, a clutch construction comprising a driving member, means for driving said driving member, a first clutch element connected to said driving member, a driven member, a second clutch element connected to said driven member, said second clutch element being in engagement with the first clutch element and being disengageable therefrom by relative axial movement of said second clutch element away from said first clutch element, a normally stationary control shaft co-axial with said driving and driven members and with said clutch elements, a means actuated by said control shaft for retracting said driven member from said driving member to disengage said first and second clutch elements upon a predetermined partial rotation of said control shaft and to re-engage said first and second clutch elements upon an additional predetermined partial rotation of said control shaft, and additional clutch means mounted on said driving member and said control shaft and engageable drivably to couple said driving member to said control shaft for a predetermined partial rotation of said control shaft, and to uncouple said driving member and control shaft after the last mentioned predetermined partial rotation of said control shaft, successive engagements of said additional clutch means acting alternately to engage and disengage said first and second clutch elements.

3. A vehicle as claimed in claim 2 in which said driven member is coaxially and slidably mounted on said control shaft, and in which said means actuated by said control shaft for retracting said driven member from said driving member, comprises a first cam member mounted on said control shaft and having an axially directed cam surface facing away from said driven member, a second cam member coaxially and slidably mounted on said control shaft and having a cam surface engaging said cam surface to provide a retracted position in which raised portions of said cam surfaces are in registration with each other, and an advanced position in which the raised portions of each of said cam surfaces are in registration with low portions of the other cam surface, means acting to urge said cam members towards each other and means connecting said second cam member to said driven member, the first and second clutch elements being disengaged when said cams are in retracted position and engaged when said cams are in advanced position.

4. In an agricultural vehicle of the type described, a clutch construction comprising a first clutch element, a second clutch element in engagement with said first clutch element and being disengageable therefrom by relative axial movement of said second clutch element away from said first clutch element, and means for controlling the engagement and disengagement of said first and second clutch elements comprising a normally stationary control shaft coaxial with said second clutch element, said second clutch element being slidably mounted on said control shaft, a first cam member mounted on said control shaft and having an axially directed cam surface facing away from said clutch elements, a second cam member coaxially and slidably mounted on said control shaft and having a cam surface engaging said cam surface to provide a retracted position in which raised portions of said cam surfaces are in registration with each other and an advanced position in which the raised portions of each of said cam surfaces are in registration with low portions of the other cam surface, means acting to urge said cam members towards each other and connecting means between said second clutch element and said second cam element, the first and second clutch elements being disengaged when said cams are in retracted position and engaged when said cams are in advanced position, and means for successively partially rotating said control shaft to move said cam members to retracted position and for additionally partially rotating said control shaft to restore said cam member to said advanced position.

References Cited in the file of this patent

UNITED STATES PATENTS

| | | |
|---|---|---|
| 1,387,406 | Kaupke | Aug. 9, 1921 |
| 2,031,650 | Hendricks et al. | Feb. 25, 1936 |
| 2,192,333 | Silver | Mar. 5, 1940 |
| 2,332,743 | Morris | Oct. 26, 1943 |
| 2,678,708 | Schill | May 18, 1954 |
| 2,687,702 | Harper | Aug. 31, 1954 |